United States Patent [19]

McShane

[11] Patent Number: 4,480,483
[45] Date of Patent: Nov. 6, 1984

[54] ACOUSTO-OPTICAL ULTRASONIC FLOWMETER

[75] Inventor: James L. McShane, Pittsburgh, Pa.

[73] Assignee: Westinghouse Electric Corp., Pittsburgh, Pa.

[21] Appl. No.: 482,736

[22] Filed: Apr. 6, 1983

[51] Int. Cl.³ .............................................. G01F 1/66
[52] U.S. Cl. .............................. 73/861.05; 73/861.27
[58] Field of Search ............... 73/204, 861.05, 861.27, 73/861.28, 861.31; 356/28, 28.5

[56] References Cited

U.S. PATENT DOCUMENTS

| | | | |
|---|---|---|---|
| 3,807,228 | 4/1974 | Matzuk | 73/861.05 |
| 3,918,304 | 11/1975 | Abruzzo et al. | |
| 3,978,713 | 9/1976 | Penney | |
| 4,121,469 | 10/1978 | Kaule | |
| 4,137,778 | 2/1979 | Primbsch | |
| 4,162,397 | 7/1979 | Bucaro et al. | |

Primary Examiner—Herbert Goldstein
Attorney, Agent, or Firm—D. Schron

[57] ABSTRACT

A flowmeter wherein measurements relating to fluid flowing in a pipe are obtained by transmitting a laser beam from a high power pulsed laser into the fluid through an optical window in the pipe. The beam in the fluid causes a rapid thermal expansion of the fluid which generates a pressure pulse which travels axially up and down the pipe. Continuously operating low power laser beams are projected into the fluid at points displaced from the source of the acoustic pulse and these beams are modulated when the acoustic pulse passes them. The modulation is detected to obtain first and second transit times, these transit times being utilized to compute the desired fluid flow parameters.

9 Claims, 6 Drawing Figures

ACOUSTO-OPTICAL ULTRASONIC FLOWMETER

BACKGROUND OF THE INVENTION

1. Field of the Invention

The invention in general relates to fluid flow measurements, and particularly to a flowmeter which utilizes lasers.

2. Description of the Prior Art

In ultrasonic flowmeters for measuring velocity or volumetric flow rate of a fluid in a pipe, acoustic energy is propagated from an upstream transducer to a downstream transducer, and vice versa, and the difference in transit times of the oppositely directed acoustic energy is utilized in the computation of fluid flow. Various other systems for example use the difference in phase oppositely directed acoustic signals while still other systems utilize a sing around technique either along a single path or along two closely spaced parallel paths, to obtain a frequency difference indicative of fluid flow.

Many such systems utilize transducers which are inserted through the walls of the fluid carrying pipe but not to an extent where the transducer would intrude into the flow. Since one or more transducers are pointed downstream and one or more transducers are pointed upstream at an angle to the pipe axis, there is a small notch or protrusion formed in the inner surface of the pipe. For some measuring systems, this discontinuity could have an adverse affect on the fluid flow which could degrade system accuracy. Further, depending upon the fluid being measured, a discontinuity may represent a location for solid particulate to collect, which, after a period of time, might block or degrade the acoustic signal.

In other types of flowmeter systems transmitter and receiver transducers are coupled to the outside of the pipe and the acoustic signals are propagated through the pipe wall, undergoing refraction at the fluid-inner wall surface interface. When measuring fluid velocity acoustically, it is desirable to have the acoustic path at a small an angle as possible with respect to the pipe axis. For example with transducers which penetrate the pipe wall a practical minimum angle is in the order of 30°. With the clamp on transducers however the practical minimum angle may range from approximately 65° to 75°.

In the present invention acoustic waves are generated at a minimum angle of 0° with respect to the pipe axis and without the requirement of any protrusion into the fluid.

In many of these acoustic systems an acoustic pulse with a fast rise time is a primary requirement in order to obtain high accuracy in the transit time measurement. The improved flowmeter described herein produces an acoustic pulse with an extremely fast rise time surpassing that produced by a conventional transducer, with the added feature that the pulse is generated directly in the fluid under measurement.

SUMMARY OF THE INVENTION

The flowmeter of the present invention includes an optical window in a wall of a fluid conveyance such as a pipe. A pulsed laser apparatus is positioned to project a laser beam into the fluid, through the optical window to cause a rapid thermal expansion of the fluid in the path of the beam. The rapid thermal expansion generates a corresponding pressure wave such that the beam path in effect acts as a line source of the pressure wave which is transmitted axially downstream and upstream of the source. A first detecting means displaced from the beam is operable to detect the pressure wave as it passes to provide a corresponding output signal, and similarly a second detecting means is so positioned to provide a corresponding output signal. A signal processing means is responsive to both output signals to provide flow related data.

In a preferred embodiment the first and second detecting means are low power continuously operating lasers with beams which are projected through respective optical windows in the pipe wall toward respective optical detectors, the output signal of which is modulated due to the modulation of the low power laser beam caused by pressure variations of the acoustic signal wavefront.

DESCRIPTION OF THE PREFERRED EMBODIMENT

Figure 1:
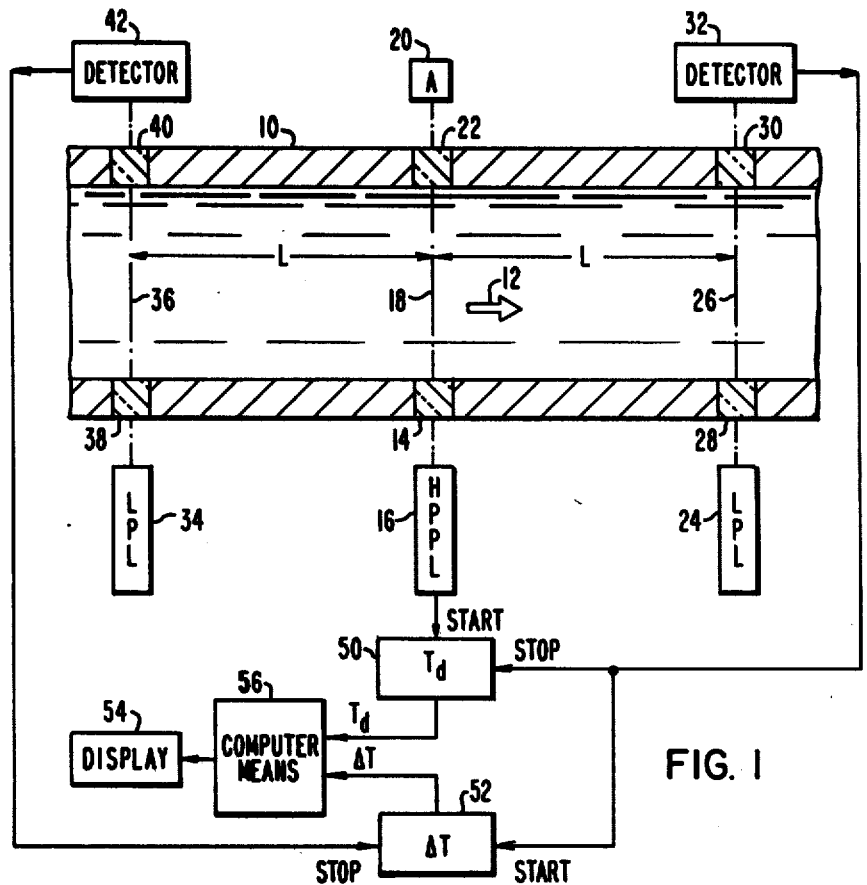
FIG. 1 illustrates in block diagram form, one embodiment of the present invention showing fluid flow measurement for fluid in a pipe, shown in axial cross section.

In FIG. 1 a fluid conveyance such as pipe 10 contains a fluid flowing in a direction as indicated by arrow 12. A first optical window 14 is positioned in the wall of the pipe and pulsed laser apparatus 16, e.g., a Q-switched ruby laser, is arranged to periodically project a high power density, short duration laser beam into the fluid through optical window 14. Suitable laser pulses could be less than 100 ns wide and have a total energy less than 1 J. The beam 18 traverses the fluid and absorption of the light energy as it propagates through the fluid along the path causes rapid localized heating and a rapid thermal expansion which results in an acoustic pulse, with the beam 18 acting as a line source of the pulse. If desired, the beam may be shaped or focussed, such focussing providing highest intensity in the vicinity of the pipe axis. The acoustic pulse is actually a pressure variation which cylindrically envelopes the beam 18 and travels both in an upstream and downstream direction. After traversing the fluid, the beam from laser 16 passes through an optical window 22 and may be absorbed by absorber 20 or redirected elsewhere. For use with transparent pipes, a small wall portion of such pipe would constitute an optical window.

Detecting means are placed upstream and downstream to detect the traveling acoustic pulse so as to derive fluid flow information therefrom. In the embodiment illustrated in FIG. 1, the downstream detection means includes a low power continuously operating laser 24, such as a helium neon laser, operable to project a laser beam 26 into the fluid through an optical window 28. The laser beam emerges from the fluid through an optical window 30 and impinges upon a detector 32.

When the wavefront of the acoustic energy interacts with the laser beam 26, pressure variations caused by passage of the wavefront cause density variations and corresponding refractive index variations resulting in a detector output signal indicative of the wavefront arrival. For example, the beam could be split into two beams separated axially by a small distance. If the beams are combined in a detector, the arrival of the wave front at the first beam will cause its propagation velocity to change with respect to the second beam's velocity and hence produce interference effects which may be detected. For maximum sensitivity, the beam of the lower power laser 24 is parallel to the beam of the high power pulse laser 16.

Another type of detection scheme could use a knife edge or other optical stop that would keep most of the light from impinging on the detector, which would be sensitive to light energy. A slight deflection or spreading of the beam would cause a significant increase in the light striking the detector which would then indicate that a change had occurred. Magnitude information need not be used.

The fast rise time of a change caused by the acoustic wave front would discriminate it against other possible disturbances.

In a similar fashion the upstream detection means includes a low power continuously operating laser 34 which projects its beam 36 into the fluid through an optical window 38. The beam emerges through optical window 40 and is sensed by detector 42 operating in a manner similar to detector 32.

In one well known acoustic measuring system, fluid measurements are made by projecting acoustic energy oppositely in upstream and downstream directions and measuring the transit time of the pulses to obtain fluid velocity or volumetric flow rates. If the distance between the source and the detector is L (the distance between the beams from lasers 16 and 24 and from 16 and 34) then the time $T_d$ for the acoustic pulse to travel downstream is:

$$T_d = \frac{L}{C + V} \tag{1}$$

Where C is the speed of sound in the fluid and V the fluid velocity. Similarly, the time it takes for an acoustic pulse to travel upstream is given by the relationship:

$$T_u = \frac{L}{C - V} \tag{2}$$

Rearranging equations (1) and (2):

$$C + V = (L/T_d) \tag{3}$$

$$C - V = (L/T_u) \tag{4}$$

Subtracting equation (4) from equation (3) results in:

$$2V = \frac{L}{T_d} - \frac{L}{T_u} \tag{5}$$

The difference in travel time $\Delta T$ from the source of an upstream detector and downstream detector is given by the relationship:

$$\Delta T = T_u - T_d \tag{6}$$

From equations (5) and (6):

$$V = \frac{L}{2} \frac{\Delta T}{T_d T_u} \tag{7}$$

Which is equivalent to:

$$V = \frac{L}{2} \frac{\Delta T}{T_d(T_d + \Delta T)} \tag{8}$$

Accordingly, and in accordance with equation (8), to obtain an indication of fluid velocity, the difference in transit time of the upstream and downstream directed acoustic pulse is obtained ($\Delta T$) as well as the downstream transit time ($T_d$). A $T_d$ counter 50 is started when laser 16 pulses and the counter is stopped when detector 32 indicates the arrival of the downstream directed pulse. The output of detector 32 simultaneously starts a $\Delta T$ counter 52 which is stopped when detector 42 indicates the arrival of the upstream directed pulse. The values of counters 50 and 52 are provided to a computing means 56 which then calculates the required velocity in accordance with equation (8) and provides it to a display 54. In a well known manner computer means 56 can additionally provide a value for volumetric flow rate, knowing the pipe dimensions. The process may be repeated for each pulse of the high power laser 16 to get an accumulation of readings and a continuous updating of the sought after information.

Figure 2:
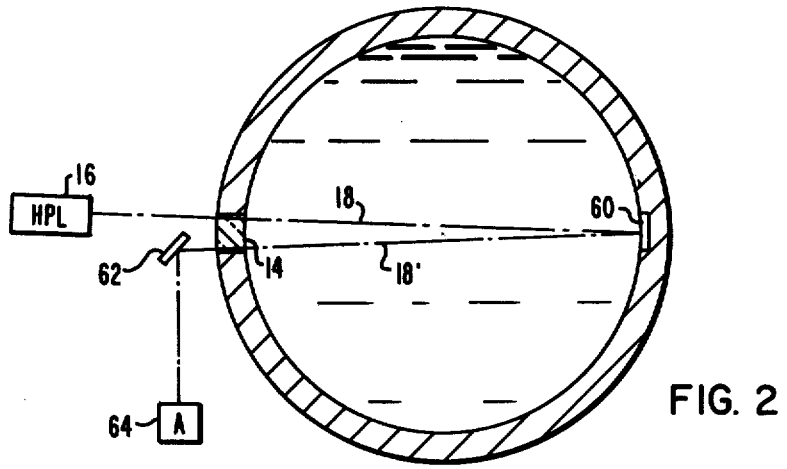
FIG. 2 illustrates a modification of the projected beam of FIG. 1.

Since the beam from the high power laser 16 may be attenuated somewhat in the fluid the beam power may vary across the pipe diameter. If the laser beam is reflected back along the line close to the line of entry, the total power will be essentially constant across the pipe. Accordingly, as illustrated in FIG. 2, a reflector or mirror 60 may be positioned opposite optical window 14 so as to reflect the beam 18 back through the fluid one or more times preferably in the same transverse plane as the original beam. Although shown on the inner surface of the pipe, the reflector could be located outside the pipe adjacent, or an integral part of, an optical window. The reflected beam, 18', passes through optical window 14 and is reflected by mirror 62 to an absorber 64.

In an idealized situation such as used in deriving equation (8), the fluid velocity in the center of the pipe, along its axis, is the same at every point along a line perpendicular to the axis out to the inner surface of the wall. In actuality, and under ideal conditions, the fluid velocity is a maximum along the center axis and decreases in accordance with a smooth velocity profile. In this case, a nominal correction factor can be used to account for the profile effect. In less than ideal cases, the velocity profile is often distorted. The present invention can be utilized to obtain an indication of the velocity profile and to this end reference is made to FIG. 3.

Figure 3:
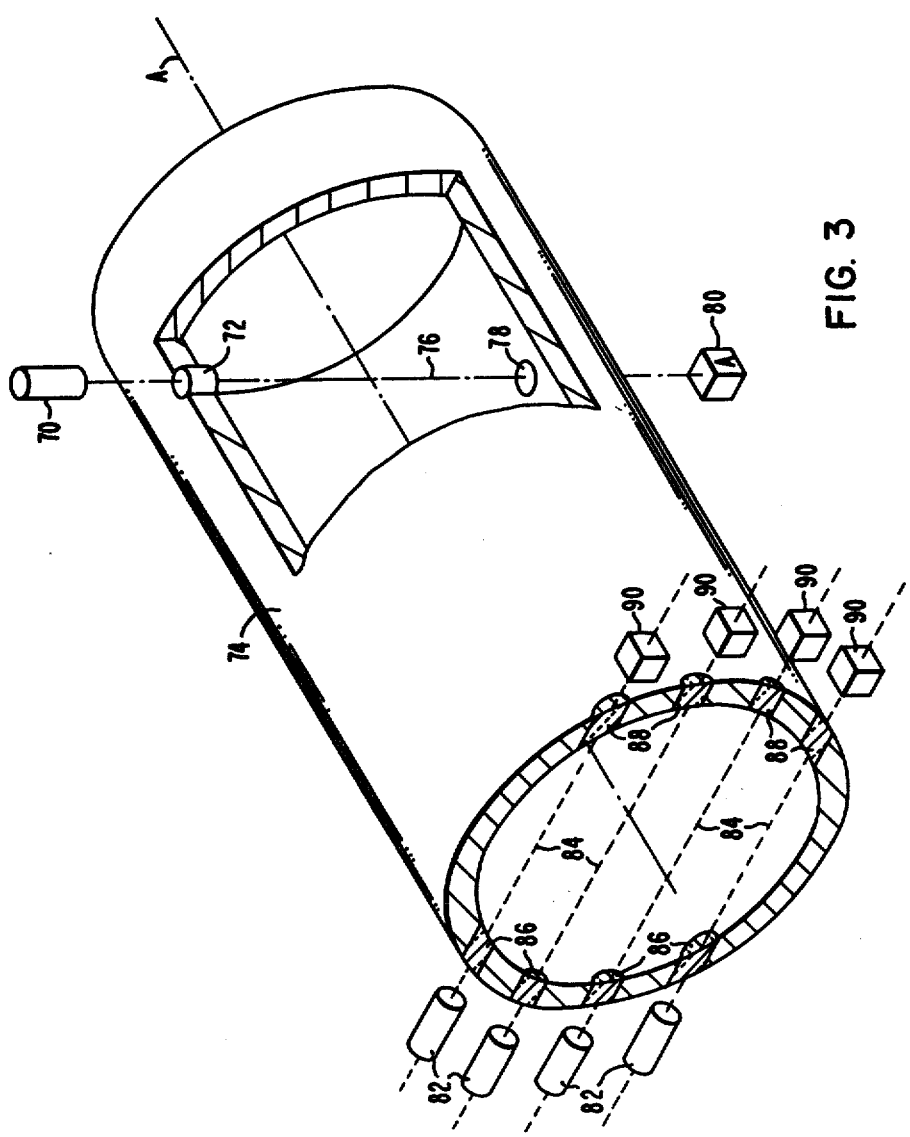
FIG. 3 is a view, partially in section and partially broken away illustrating the apparatus in the obtaining of flow profile.

In FIG. 3 a high power pulse laser is positioned to project the laser beam through optical window 72 in fluid conveying pipe 74 for creating a pressure wave in the fluid by virtue of the beam 76, as previously described. The beam emerges from the fluid via an optical window 78 where it is absorbed by absorber 80.

A plurality of low power continuously operating lasers 82 are axially displaced from beam 76 and are arranged to project detecting beams 84 through respective optical windows 86. Alternatively, the multiple beams could be produced by optically splitting the beam from one laser. After traversing the fluid, the beams 84 emerge through optical windows 88 and impinge upon respective detectors 90 operable to provide individual output signals as previously described with respect to detectors 32 and 42 of FIG. 1.

Figure 4A:
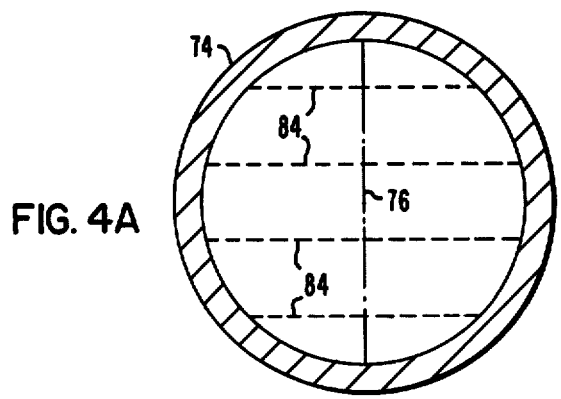
FIGS. 4A, B and C are views to further illustrate the operation of the arrangement of FIG. 3.

FIG. 4A, illustrating an end view of the apparatus of FIG. 3, shows the relationship between the beams of the high power pulse laser and low power continuous lasers. More particularly, detecting beams 84 all lie in the same plane and are parallel to one another, with these beams being perpendicular to the projection of beam 76 onto the plane.

Figure 4B:
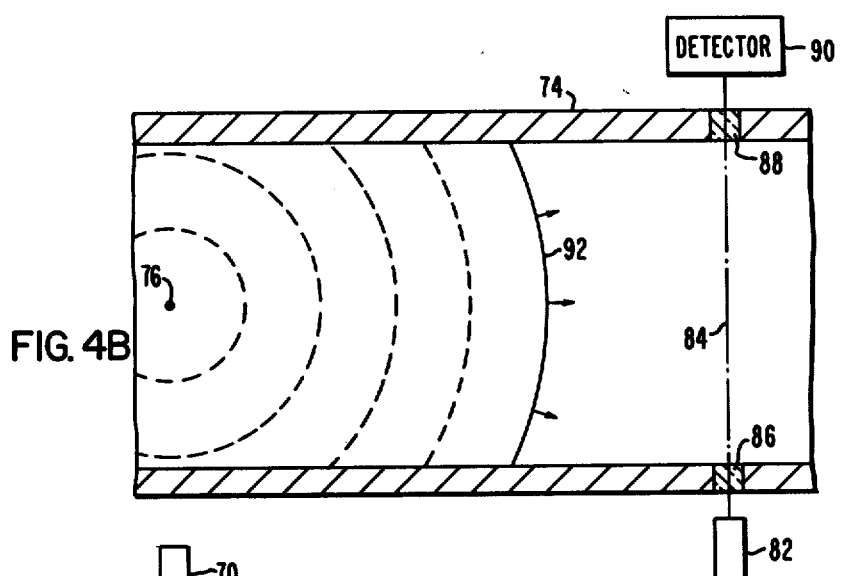

The plan view of FIG. 4B illustrates the acoustic wave 92 at various points in time as it emanates from the line source, that is beam 76. In the absence of fluid flow, the leading edge of wavefront 92 will arrive simultaneously at all four detecting beams 84 such that all four detectors 90 would provide corresponding output signals at the same time.

Figure 4C:
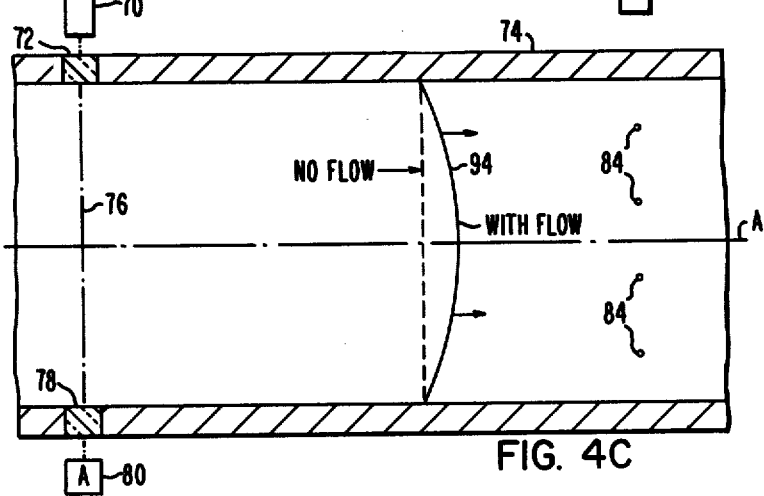

In the presence of fluid flow, and as illustrated in the elevational view of FIG. 4C, the velocity is not uniform across the pipe but takes on a velocity profile as indicated by numeral 94. The profile 94 shows a peak velocity along the axis A of the pipe in which velocity decreases in value relative to the maximum as the pipe wall is approached. In the presence of the velocity profile 94 the acoustic wave 92 will not simultaneously impinge upon the detecting beams 84 and detectors 90 will provide output signals at the different times indicative of the velocity profile which, once determined, can provide for necessary corrections of the measured flow rate. In order to measure or compensate for flow profile in two dimensions, crossed transmit beams and crossed sets of detecting beams may be utilized.

Accordingly an acousto optical ultrasonic flowmeter has been described wherein an acoustic signal travels axially in the pipe from a line source without any physical insertion of a line source into the pipe. The apparatus is useful for not only large diameter pipes but also for small diameter pipes where transducer installation on or in the pipe would represent a difficult mounting problem.

I claim:

1. Flowmeter apparatus for obtaining flow related data of a fluid flowing in a fluid conveyance comprising:
   (a) an optical window in the wall of said fluid conveyance;
   (b) pulsed laser apparatus positioned to project a laser beam into said fluid through said optical window;
   (c) said pulsed laser apparatus being of sufficiently high power density and short duration so as to cause a rapid thermal expansion of the fluid in the path of said beam, said thermal expansion generating a corresponding pressure wave, said beam within said conveyance acting as a line source of said pressure wave;
   (d) first detecting means disposed from said beam and operable to detect said pressure wave as it passes, to provide a corresponding indication thereof;
   (e) at least a second detecting means disposed from said beam and operable to detect said pressure wave as it passes, to provide a corresponding indication thereof;
   (f) signal processing means responsive to said indications to provide said flow related data.

2. Apparatus according to claim 1 wherein:
   (a) said first detecting means is positioned downstream of said pulse laser apparatus; and
   (b) said second detecting means is positioned upstream of said pulse laser apparatus.

3. Apparatus according to claim 1 wherein each said detecting means includes:
   (a) an optical window in the wall of said fluid conveyance;
   (b) a low power laser positioned to project a laser beam into said fluid through said optical window;
   (c) a detector for detecting modulation of said low power laser beam as said pressure wave passes it.

4. Apparatus according to claim 3 which includes:
   (a) an additional optical window positioned to allow exiting of said low power laser beam from said fluid;
   (b) said detector being positioned to intercept said exiting beam.

5. Apparatus according to claim 4 wherein:
   (a) said beam from said pulsed laser is parallel to said beam from said low power laser.

6. Apparatus according to claim 1 wherein:
   (a) said signal processing means obtains the difference in transit times of said pressure wave to said first and second detecting means.

7. Apparatus according to claim 1 which includes:
   (a) an optical window positioned to allow exiting of said beam from said pulsed laser; and
   (b) an absorber positioned to absorb the energy of said exiting beam from said pulsed laser.

8. Apparatus according to claim 1 which includes:
   (a) a reflector opposite said optical window and positioned to reflect said beam from said pulse laser back through said optical window.

9. Apparatus according to claim 3 which includes:
   (a) means for projecting a plurality of low power laser beams into said fluid;
   (b) said beams of said plurality being coplanar and parallel to one another;
   (c) said beam from said pulsed laser being parallel to said plane of said plurality of beams;
   (d) the projection of said beam from said pulsed laser onto said plane, being perpendicular to said plurality of parallel beams.

* * * * *